J. B. WETMORE.
EXPLOSIVE ENGINE PRIMER.
APPLICATION FILED MAR. 2, 1914.
1,128,643.
Patented Feb. 16, 1915.
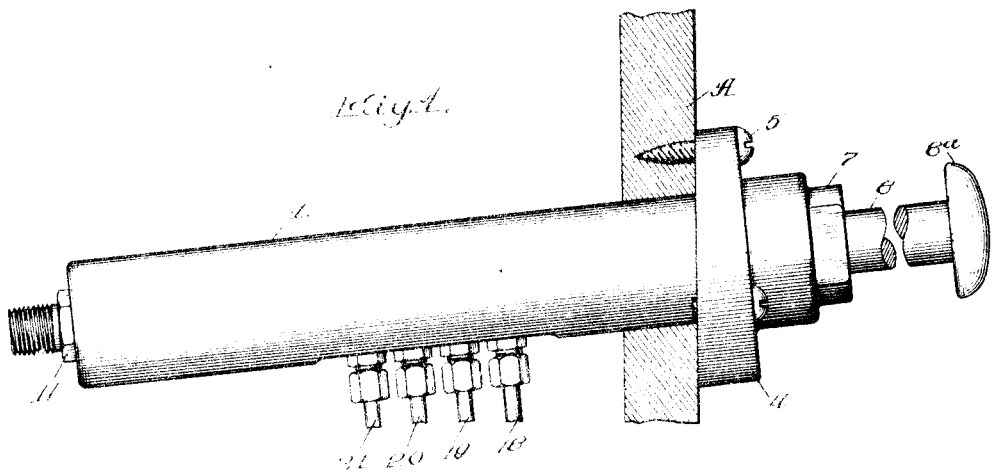
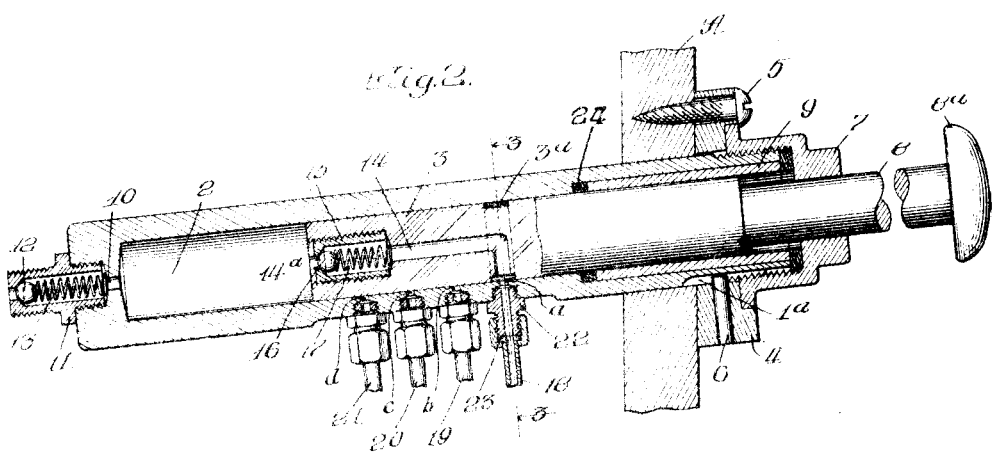
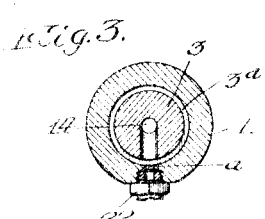
Witnesses:
Inventor
James B. Wetmore
By Rector Hibben Davis & Macauley
His Attys.

UNITED STATES PATENT OFFICE.

JAMES B. WETMORE, OF CHICAGO, ILLINOIS, ASSIGNOR TO WILLIAM A. PRESS, OF CHICAGO, ILLINOIS.

EXPLOSIVE-ENGINE PRIMER.

1,128,643.  Specification of Letters Patent.  Patented Feb. 16, 1915.

Application filed March 2, 1914. Serial No. 821,965.

*To all whom it may concern:*

Be it known that I, JAMES B. WETMORE, a citizen of the United States, residing at Chicago, Cook county, Illinois, have invented certain new and useful Improvements in Explosive-Engine Primers, of which the following is a specification.

My invention relates to a primer for explosive engines and the object thereof is to provide a simple, efficient and reliable primer for injecting the fuel directly into the cylinders of the engine for starting purposes.

Various features of advantage and utility in my primer will be apparent from the description hereinafter given.

In the drawing, Figure 1 is an elevation of the primer shown attached to the dash of an automobile; Fig. 2 a central longitudinal section thereof; and Fig. 3 a cross section on the line 3—3 of Fig. 2.

Referring to the particular embodiment of my invention as herein shown, the primer comprises a cylinder 1 containing a piston chamber 2 within which reciprocates a piston or plunger 3. The cylinder is adapted to be supported in any desired position and in any desired manner adjacent the engine or upon the automobile body in case the engine is used for operating an automobile. In the present instance I have shown this cylinder passing through the dash A of an automobile and secured thereto by means of a collar 4 which is fastened to the dash by means of the screws 5. The cylinder is prevented from turning in the collar in any suitable manner as by means of the pin or projection 6 received within the longitudinal groove 1ª of the cylinder. The rearward end of the cylinder is closed by means of an end cap 7 through which passes the stem 8 of the piston terminating in a handle 8ª. The end cap screws upon the end of the cylinder and against the collar 4 whereby the structure is held securely and firmly in place upon the dash. By preference a removable bushing 9 is inset in the rearward end of the piston chamber 2, such bushing being of considerable length and at its forward end confining an annular packing 24 which is so arranged as to remain in contact with the cylindrical rear end of the piston throughout its range of movement.

The forward end of the cylinder is provided with an inlet port 10 adapted to communicate with a source of fuel supply such as gasolene, and with the piston chamber 2. This port is check-valved and according to the construction herein illustrated a nipple 11 is screw-threaded into the end of the cylinder to form a continuation or part of the inlet port 10 and to contain the check valve which is in the form of a ball 12, spring-pressed by means of a light spring 13. The forward end of this nipple is also screw-threaded so that it may be readily connected to a pipe or the like communicating with the source of fuel.

The forward end of the piston is provided with a longitudinal passage 14 communicating with the forward end of the piston chamber 2 and at its rearward end turned at right angles to communicate with a circumferential groove 3ª on the piston. This passage 14 is by preference check-valved, and according to the present construction, a bushing 15 is screw-threaded into the forward end of the piston and forms a continuation or part of the passage 14. This bushing contains a check-valve which is in the form of a ball 16, spring-pressed to close the inlet port 14ª by means of a light spring 17. The particular purpose and function of this check-valve will be hereinafter explained.

The cylinder has a series of discharge ports which are here shown as four in number and marked *a, b, c,* and *d*. Because the particular primer being described is one used in connection with a four-cylinder engine, it is obvious that the number of these discharge ports will correspond with the number of cylinders of the engine. These discharge ports pass through the cylinder and emerge upon the inner wall of the piston chamber, the same being governed by the piston. In order to provide means for connecting these discharge ports with the supply pipes or leads 18, 19, 20 and 21, which extend to the engine cylinders, each discharge port has a nipple 22 connected to its pipe by means of the coupling 23.

Describing a complete cycle of operation of the primer and assuming that the piston is in its forward position, when the piston is drawn rearwardly the fuel will be sucked into the front end of the piston chamber, the check-valve 12 opening for that purpose. The piston is thereupon moved forwardly thereby placing the liquid fuel trapped in front of the piston under pressure with the result that when the circumferential groove 3ª of the piston registers with the first port *a* the fuel will be forced therethrough and through the supply pipe 18 to one of the engine cylinders. The piston then in its continued forward movement next registers with the port *b* and the liquid fuel under pressure is forced through the supply pipe 19 and so on in like manner and in successive action as to the remaining ports *c* and *d*. Although a single operation of the primer should be sufficient under ordinary conditions yet the operation can be repeated as desired by the operator according to conditions. In the forward movement of the piston the check valve 16 opens and freely permits the liquid fuel to pass through the piston to the circumferential groove and thence to be discharged as described. This check-valve prevents any flow of liquid or fluid in the opposite direction and the same is preferably employed in order to make a positive suction on the fuel supply and prevent any suction action from the engine and through the leads 18—21 as the piston is being drawn outwardly. By running the port and passage 14 through the body of the piston and connecting it with a circumferential groove it becomes unnecessary to prevent rotation or any turning movement of the piston in the cylinder as will be necessary in case the passage was merely a groove or the like along the outer surface of the piston.

I claim:

1. A primer comprising a cylinder having a discharge port through one side, and a piston reciprocatable in the cylinder and having intermediate its length an external groove adapted to register with the discharge port and also having a passage communicating between the groove and one end of the cylinder, the cylinder having at said end a check-valved fuel supply port for admitting fuel to the cylinder on the suction stroke of the piston, the piston on its discharge stroke forcing the fuel from the cylinder through said passage, groove and discharge port.

2. A primer comprising a cylinder having a series of discharge ports through one side and also having a fuel supply port for admitting fuel to the cylinder on the suction stroke of the piston, and a piston reciprocatable in the cylinder and having intermediate its length an external groove, and a passage communicating between the front end of the piston and the groove, the piston on its discharge stroke forcing the fuel from the cylinder through said passages, groove and discharge ports, such groove being arranged to register with the discharge ports successively.

3. A primer comprising a cylinder having a series of discharge ports through one side and also having a fuel supply port and a piston reciprocatable in the cylinder and having intermediate its length an external groove, and a passage extending through the body of the piston from the front end thereof to the groove, such groove being circumferential and arranged to register with the discharge ports successively.

4. A primer comprising a cylinder having a series of discharge ports through one side and also having a fuel supply port and a piston reciprocatable in the cylinder and having intermediate its length an external groove, and a passage communicating between the front end of the piston and the groove, such groove being arranged to register with the discharge ports successively and said passage being check-valved for flow only toward the groove.

5. A primer comprising a cylinder having a series of discharge ports through one side and also having a fuel supply port and piston reciprocatable in the cylinder and having intermediate its length an external groove, and a passage communicating between the front end of the piston and the groove, such groove being arranged to register with the discharge ports successively, and said fuel supply port and said passage being check-valved for flow only to the cylinder and the groove.

6. A primer comprising a cylinder having a series of discharge ports through one side and intermediate the length thereof and also having a fuel supply port entering its front end, and a piston reciprocatable in the cylinder and having intermediate its length an external groove, and a passage communicating between the front end of the piston and the groove, such groove being arranged to register with the discharge ports successively.

7. A primer comprising a cylinder having a series of discharge ports through one side and intermediate the length thereof, and also having a fuel supply port entering its front end, and a piston reciprocatable in the cylinder and having intermediate its length a circumferential groove and a passage communicating between the front end of the piston and the groove, such groove being arranged to register with the discharge ports successively.

8. A primer comprising a cylinder having a series of discharge ports through one side and intermediate the length thereof and also having a fuel supply port entering its front end, and a piston reciprocatable in the cylinder and having intermediate its length an external groove, a passage communicating between the front end of the piston and the groove, such groove being arranged to register with the discharge ports successively, a bushing in the front end of the passage and forming a part thereof, and a check valve in the bushing.

JAMES B. WETMORE.

Witnesses:
DAVID K. BEATH,
ROBERT DOBBERMAN.